United States Patent [19]

Doi et al.

[11] Patent Number: 4,738,396

[45] Date of Patent: Apr. 19, 1988

[54] VEHICLE AIR CONDITIONER

[75] Inventors: Shigetoshi Doi; Yoshiaki Nagayama, both of Hiroshima; Katsumi Iida, Saitama, all of Japan

[73] Assignees: Matsuda K. K., Hiroshima; Diesel Kiki K. K., Tokyo, both of Japan

[21] Appl. No.: 58,039

[22] Filed: Jun. 4, 1987

[30] Foreign Application Priority Data

Jun. 18, 1986 [JP] Japan ................................. 61-141588

[51] Int. Cl.⁴ .......................................... G05D 23/00
[52] U.S. Cl. .................................. 237/2 A; 236/13; 236/91 F; 165/12; 165/16; 165/39
[58] Field of Search ............ 237/2 A, 12.3 A, 12.3 B; 236/13, 91 F, 49, 46 F; 165/12, 16, 43, 39

[56] References Cited

U.S. PATENT DOCUMENTS 4,538,760  9/1985  Kobayashi .......................... 237/2 A Primary Examiner—Henry A. Bennett
Attorney, Agent, or Firm—Yusuke Takeuchi

[57] ABSTRACT

The operational temperature TP is determined as a function of the compartment temperature Tr. The blower speed is controlled along the characteristic line, the slope of which varies with the operational temperature TP. When the temperature of engine cooling water reaches a predetermined temperature, the speed of the blower is increased along the slope corresponding to the compartment temperature Tr. When the operational temperature TP is at least the predetermined temperature Tl, the speed of the blower is controlled as a function of time so that any violent increase in the blower speed may be prevented.

4 Claims, 6 Drawing Sheets

VEHICLE AIR CONDITIONER

BACKGROUND OF THE INVENTION

1. Field of the Invention

The present invention relates to vehicle air conditioners, especially to a device for controlling the speed of revolution of the blower.

2. Description of the Prior Art

Figure 5:
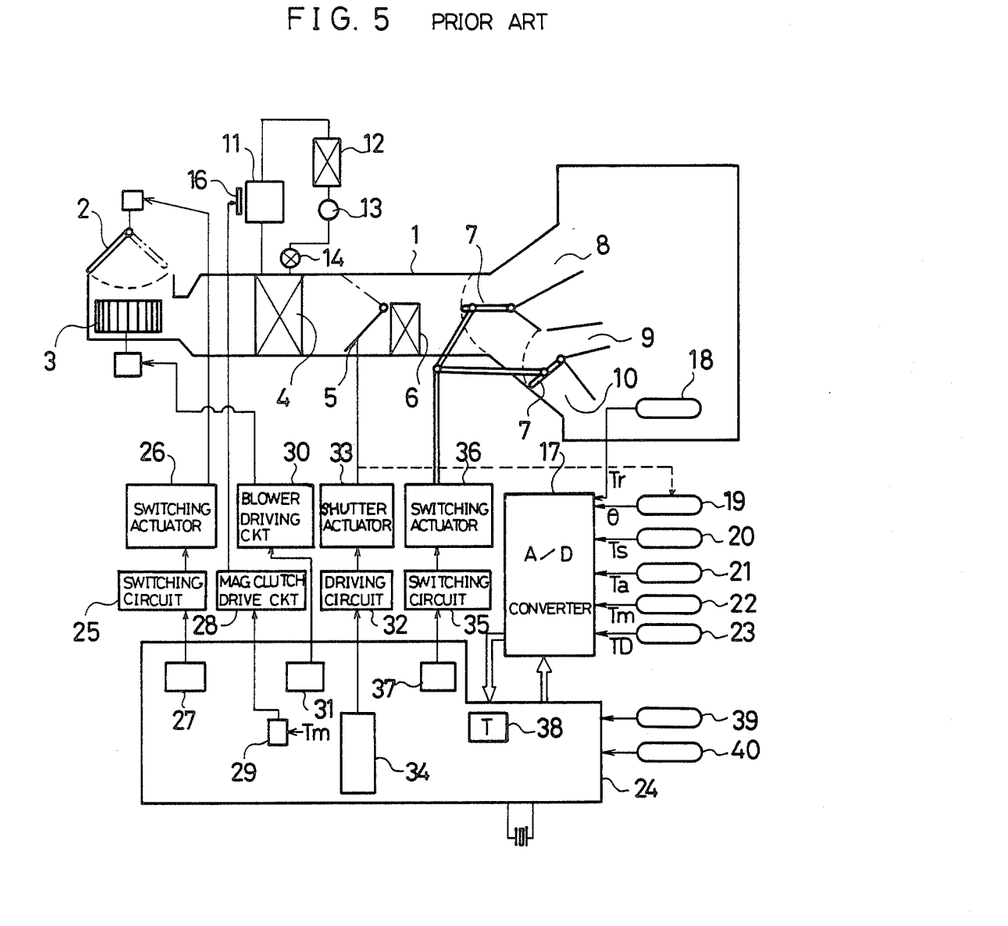
FIG. 5 is a block diagram of an air conditioner controlling device according to the prior art.

As FIG. 5 shows, a typical vehicle air conditioner according to the prior art consists of a duct 1, a shutter 2 provided at the inlet of the duct, a blower 3, an evaporator 4, a mixing shutter 5, a heater core or radiator 6, a mode switching shutter 7, a defrosting outlet or vent 8, a face level outlet or vent 9, and a foot level outlet or vent 10. The evaporator 4 consititutes a refrigeration circuit together with a compressor 11, a condensor 12, a receiver tank 13, and an expansion valve 14. The revolution of the engine (not shown) is transmitted to the compressor 11 through a magnetic clutch 16.

An A/D converter 17 is provided to convert respective analog signals of the compartment temperature $Tr$ sensed by a compartment temperature sensor 18, the opening $\theta$ of the mixing shutter 5 sensed by a position sensing potentiometer 19, the sunshine temperature $Ts$ sensed by a sunshine sensor 20, the ambient temperature $Ta$ sensed by an ambient air sensor 21, the evaporator temperature $Tm$ sensed by an evaporator temperature sensor 22, and the desired temperature $Td$ set by a temperature setting device 23 into the corresponding digital signals, which are fed to a controlling device 24.

The controlling device 24 is composed of, for example, a microcomputer and consists of a shutter controlling means 27 for controlling the shutter 2 through a switchng circuit 25 and an actuator 26, a compressor controlling means 29 for controlling the magnetic clutch 16 through a driving circuit 28, a blower controlling means 31 for controlling the blower 3 through a driving circuit 30, a mixing shutter controlling means 34 for controlling the mixing shutter 5 through an actuator 33, a mode switching shutter controlling means 37 for controlling the mode switching shutter 7 through a switching circuit 35 and an actuator 36, and an operational means 38 for computing the total signal $T$ from the respective data $Tr$, $Ts$, $Ta$, $Tm$, and $Td$ and feeding it to the respective controlling means. The signals from a manual switch 39 for controlling the blower and a water temperature switch 40 for sensing the water temperature of the radiator are also fed to the controlling device 24.

When the evaporator temperature $Tm$ sensed by the sensor 22 reaches a level slightly higher then the frozen point of the evaporator, the compressor controlling means 29 turns off the compressor 11 to keep the temperature of the evaporator 4 constant at the level.

Figure 6:
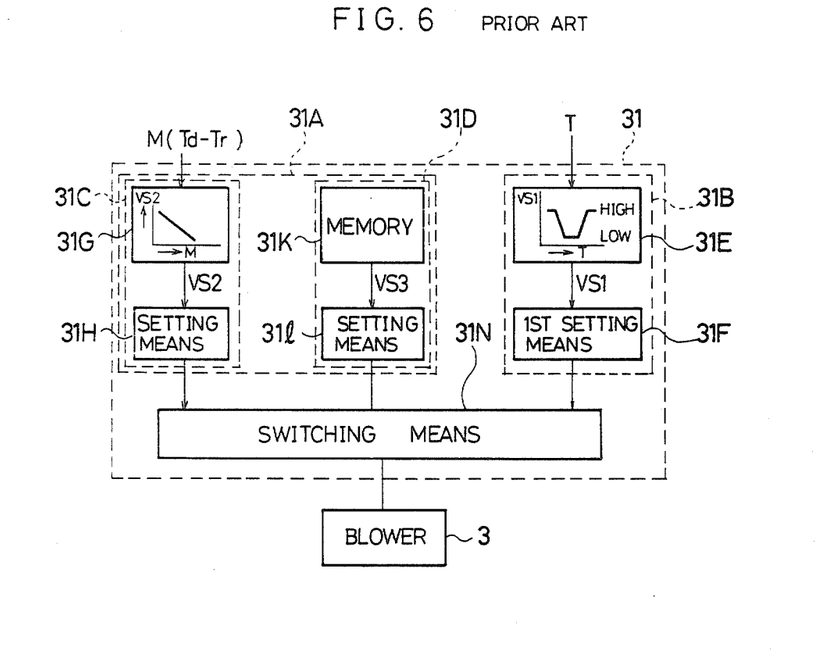
FIG. 6 is a block diagram of the blower controlling section of the controlling device of FIG. 5.

As FIG. 6 shows, the blower controlling means 31 consists of a start controlling section 31A which operates when the blower 3 starts upon start of the engine and an automatic controlling section 31B for controlling the blower 3 based on the total signal $T$ in the automatic control mode. The start controlling section 31A consists of a start controlling section 31C operable at the start time of the heater and a start controlling section 31D operable at the starting time of the cooler.

The automatic control section 31B includes a first setting section 31F responsive to the total signal $T$ to read a driving voltage VS1 from a memory 31E and feed it to the blower 3. As shown in FIG. 6, the driving voltage VS1 takes a high or low status depending on the total signal $T$ for driving the blower 3 in the automatic controlling mode.

As described in Japanese U.M. Patent Kokai No. 59-38105, the start controlling section 31C has a setting means 31H for reading a driving voltage VS2 from a memory 31G at the initial period of a heating operation to set the blower 3 at the number of revolutions corresponding to the voltage VS2. The start controlling section 31D has a setting section 31I for reading a driving voltage VS3 from a memory 31K at the initial period of a cooling operation to set the blower 3 at the number of revolutions corresponding to this voltage VS3. When the driving voltage VS2 or VS3 exceeds the driving voltage VS1, a switching means 31N switches the blower control from the first or second start controlling section 31C or 31D to the automatic controlling section 31B.

Figure 7:
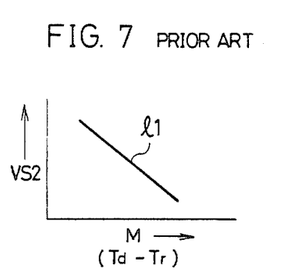
FIGS. 7 through 9 are graphs showing the characteristics of the controlling device of FIG. 5.

As FIG. 7 shows, the driving voltage VS2 from the memory 31G increases as the value M of the following equation (1)

$$M = Td - Tr \quad (1)$$

decreases, or the compartment temperature $Tr$ increases. Consequently, the number of revolutions of the blower 3 increases as the compartment temperature $Tr$ increases in the initial period of engine start so as to provide a more comfortable heating condition. When the driving voltage VS2 fed to the blower 3 exceeds the driving voltage VS1 from the memory 31E, or $$M = Td - Tr < \alpha$$

where $\alpha$ is a variable varying with the total signal $T$, the blower 3 is controlled by the automatic control section 31B in the automatic control mode.

Figure 8:
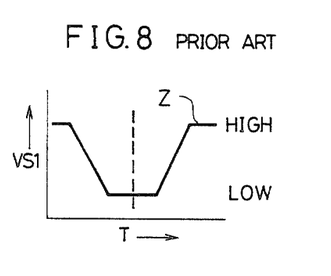

That is, the blower is controlled by the driving voltage VS1 having a characteristic Z, as shown in FIG. 8, which is a function of the total signal $T$ given by the following equation (2):

$$T = (N \cdot Ts + L \cdot Tr + M \cdot Ta + O \cdot Tm) - K \cdot Td \quad (2)$$

where K, L, M, N, and O are constants. In this way, the number of revolutions of the blower 3 is automatically determined based on the respective temperature signals $Td$, $Tr$, $Ta$, $Ts$, and $Tm$. In other words, the blower 3 is controlled by the automatic control section 31B in the automatic control mode after its speed of revolution reaches a predetermined starting level as the compartment temperature $Tr$ is increased by the start control section 31C or 31D. If the automatic control mode is employed from the beginning, a strong blow of cold or hot air can be produced and the number of revolutions of the blower 3 is changed rapidly at the time of engine start, providing an uncomfortable air condition.

Figure 9:
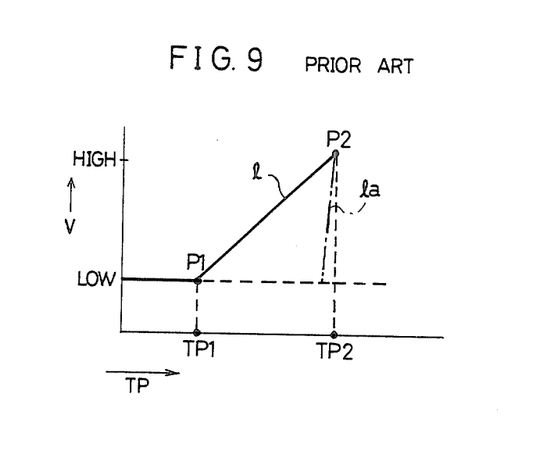

We have already proposed the following improved method using the afore-mentioned start control section 31C. In this method, the blower is controlled by the driving voltage having a characteristic such as shown in FIG. 9, in which the operational temperature TP and the blower driving voltage V are taken as abscissa and ordinate, respectively. The computed temperature TP is given by $$TP = Td + (Tr - 25) \quad (3)$$

where Td is the desired temperature set in the temperature setting device 23 and Tr is the compartment temperature sensed by the sensor 18 disposed in the vehicle compartment.

The driving voltage characteristic 1 for starting the blower 3 in the heating operation becomes a straight line joining points P1 and P2. The speed of revolution of the blower 3 is increased from the point P1 corresponding to the operational temperature TP1 at which the engine cooling water reached a predetermined temperature (for example, 40° C.). Hereinafter, the operational temperature TP1 at the point P1 is referred to as the sensed operational temperature TP1. Until this point P1, the blower 3 rotates at a low speed with a low voltage applied when the power switch is turned on. The blower 3 rotates at a high speed with a high voltage applied at the point P2 or operational temperature TP2 at which the operational temperature TP is, for example, 16° C. Hereinafter, this operational temperature is referred to as the desired conversion temperature TP2.

When the power switch 9 is turned on, the blower 3 starts to rotate at a low speed. When the engine cooling water for heating the heater core reaches, for example, 40° C., the blower driving voltage increases along the straight line 1 between the sensed operational temperature TP1 (P1) and the desired conversion temperature TP2 (P2) to increase the speed of the blower 3. The acceleration of the blower can be controlled by adjusting the slope of the line 1 at the sensed operational temperature TP1 so as to enhance passenger's feeling. Then, the blower is operated in the automatic control mode.

In the above vehicle air conditioner, after the water temperature reches 40° C., the blower can be accelerated in response to an increase of the desired temperature Td or compartment temperature Tr so as to increase slowly the speed of a hot air flow, but there is a delay in operation of the water temperature switch because the water temperature switch is disposed in the vicinity of the heater core instead of sensing directly the water temperature. Consequently, the operational temperature TP becomes high when the compartment temperature is relatively high in the intermediate period or at the time of restarting. As FIG. 9 shows, the point P1 is shifted to a great extent toward the point P2, making a sharp slope 1a of the driving voltage. As a result, the blower is accelerated too much to provide a comfortable heating condition. This shortcoming is felt especially in a vehicle with a direct injection diesel engine which produces little exhaust heat (or the ambient temperature is very low or the number of passengers is very large) because the temperature of the engine cooling water takes long time to reach 40° C. after the engine starts running.

SUMMARY OF THE INVENTION

Accordingly, it is a primary object of the invention to provide a vehicle air conditioner with a device for preventing a rapid increase of the volume of air from the blower, thereby providing a more comfortable air condition than before.

According to the invention there is provided an improved control device for controlling the speed of the blower of a vehicle air conditioner in response to changes of an operational temperature TP which is a function of at least a compartment temperature Tr, wherein the improvement comprises first setting means for increasing the speed of said blower along a characteristic line, the slope of which varies with said operational temperature TP at a time when the temperature of engine cooling water reaches a first predetermined temperature; and second setting means for increasing the speed of said blower as a function of time when said operational temperature TP exceeds a second predetermined temperature Tl.

The other objects, features, and advantages of the invention will become more apparent from the following description taken in conjunction with the accompanying drawings.

DESCRIPTION OF THE PREFERRED EMBODIMENTS

Figure 1:
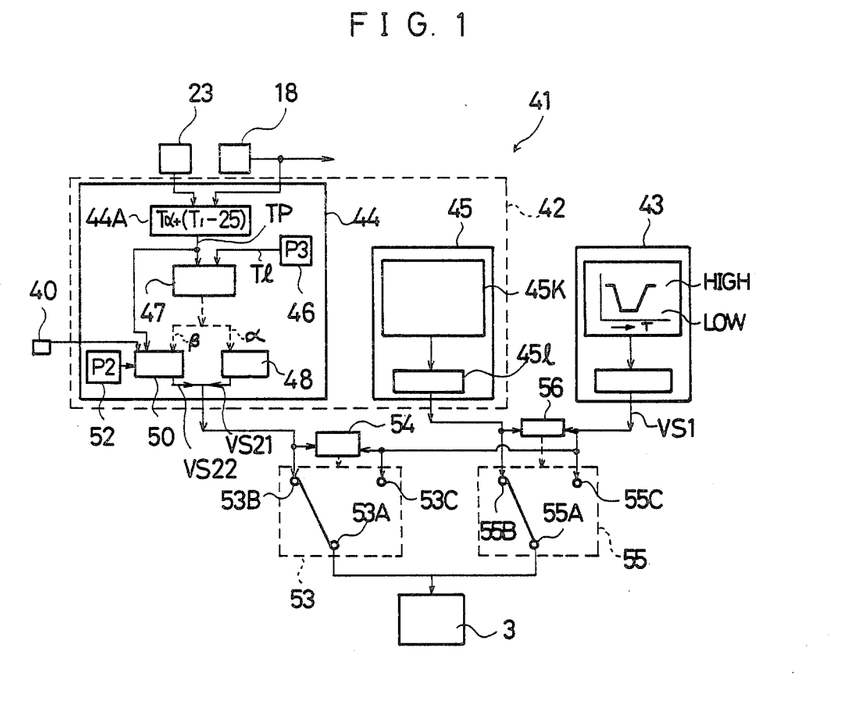
FIG. 1 is a block diagram of an air conditioner controlling device embodying the present invention.

Referring now to FIG. 1 there is shown a blower controlling device 41 according to the invention. The blower controlling device 41 consists of a start controlling section 42 operable when the blower 3 starts to rotate and an automatic control section 43 for controlling the blower 3 in the automatic control mode. The automatic control section 43 is the same as the automatic control section 31B of the prior art as shown in FIG. 6.

The start control section 42 consists of a first start control section 44 operable at the time of starting the heater and a second start control section 45 operable at the time of starting the cooler. The second or cooler start control section 45 consists of a memory 45K and a setting means 45l. This second section 45 is the same as the start control section 31D and, therefore, its detailed description will be omitted.

The first or heater start control section 44 includes an operational means 44A responsive to the desired temperature Td set in the temperature setting means 23 and the compartment temperature Tr sensed by the sensor 18 disposed within the compartment to output the operational temperature TP given by the following equation $$TP = Td + (Tr - 25) \quad (4)$$

A given temperature limit Tl, for example, 13° C. is set in an auxiliary temperature setting means 46. This temperature Tl determines the limit point P3 at which the blower can be started to accelerate. As FIG. 2 shows, the limit setting temperature Tl can be any point close to the desired temperature TP2.

The output TP of the operational means 44A and the output Tl of the auxiliary temperature setting means 46 are compared in a comparator 47. When the operational temperature TP is higher than the set temperature Tl, the comparator 47 outputs a first sense signal $\alpha$ while TP is lower than Tl, it outputs a second sense signal $\beta$.

Figure 3:
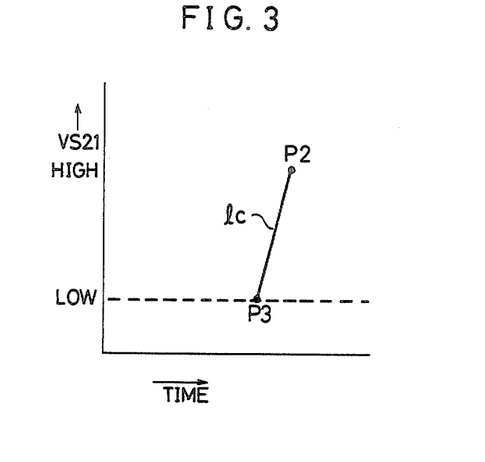

A first setting means 48 is responsive to the first sense signal $\alpha$ to read a voltage VS21 based on a predetermined characteristic 1c such as shown in FIG. 3 and feed it to the blower 3. In this embodiment, the starting point of the characteristic 1c is set so as to agree with the point P3, and the terminating point with the point P2. As FIG. 3 shows, the first driving voltage VS21 increases with the time from the low status (P3) to the high status (P2) in a period of, for example, 90 seconds.

Figure 2:
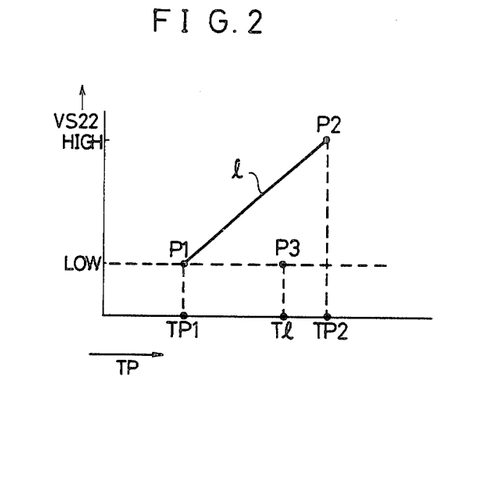
FIGS. 2 and 3 are graphs showing the characteristic of the controlling device of FIG. 1.

A second setting means 50 is responsive to the second sense signal β to output a voltage VS22 varying along the characteristic line 1, as shown in FIG. 2, joining the point P1 corresponding to the operational temperature TP1, for example, 40° C. sensed by the water temperature switch 40 and the point P2 set by the setting means 52.

A selection means 53 has a movable contact 53A connected to the blower 3, a normally closed contact 53B connected to the first start control means 44, and a normally open contact 53C connected to the automatic control means 43. A driving means 54 is provided to compare the output of the first or second setting means 48 or 50 and the output of the automatic control section 43 and, when both the outputs agree, switches the movable contact 53A from the normally closed contact 53B to the normally open contact 53C.

A selection means 55 has a movable contact 55A connected to the blower 3, a normally closed contact 55B connected to the second start control section 45, and a normally open contact 55C connected to the automatic control section 43. A driving means 56 is provided to compare the output of the second start control section 45 and the output of the automatic control section 43 and, when both the outputs agree, switches the movable contact 55A from the normally closed contact 53B to the normally open contact 55C.

Figure 4:
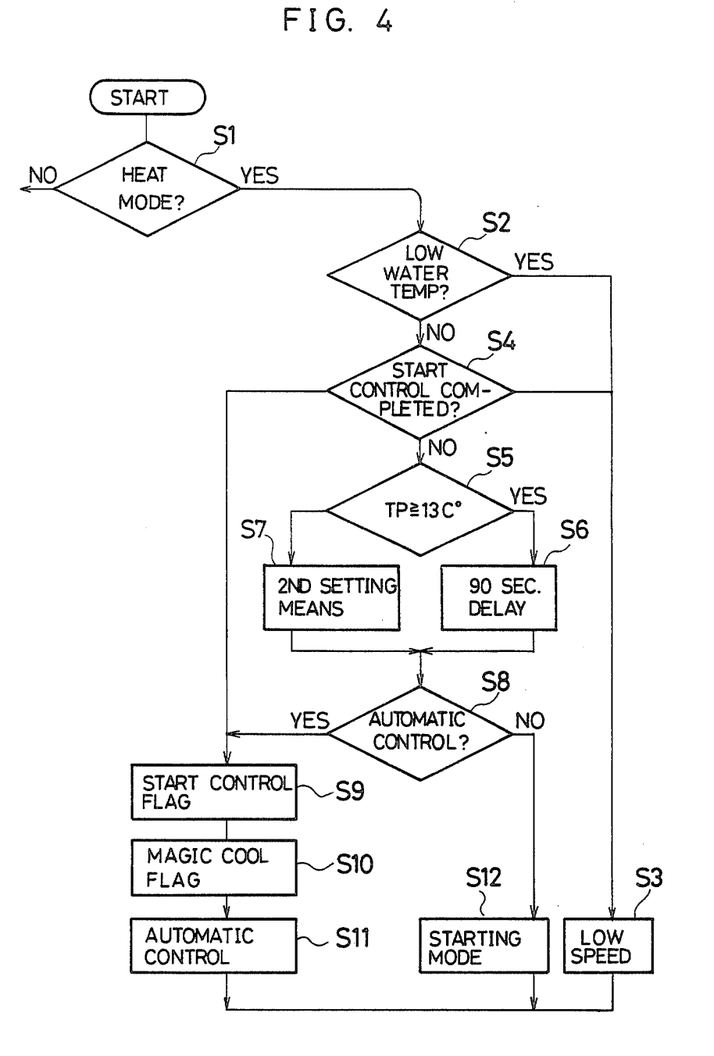
FIG. 4 is a flow chart for the controlling device of FIG. 1.

The operation of the control device will be described with reference to FIG. 4. In Step S1, suppose that in response to a mode switching signal, the controlling device 24 is in the heating mode. If the temperature of engine cooling water is found lower than a predetermined level, for example, 40° C. in Step 2, the blower controlling device 41 brings the blower 3 to a low speed operation in Step 3.

If the temperature of engine cooling water is found at least the predetermined level or 40° C. in Step 2, it is decided in Step 4 if the start controlling operation is completed or not. If it is not completed, in Step S5, the comparator 47 compares the operation temperature TP with the predetermined temperature T1, for example, 13° C. Suppose that the operational temperature is higher than the predetermined temperature. In other words, the acceleration point P1 of the blower 3 is at the point P3 in FIG. 2, which is close to the desired operational temperature P2.

At this point, the first setting means 48 feeds the blower 3 with the first start voltage VS21 in FIG. 3 through the selection means 53. The temperature of the engine cooling water rises in 90 seconds before the blower 3 rotates at high speeds since the first driving voltage VS21 has been set to become high in 90 seconds. Thus, when the temperature of the engine cooling water is low, the blower 3 is prevented from rotating at high speeds (in Step S6).

In the above Step S5, if the operational temperature TP is lower than the predetermined temperature T1, the second setting means 50 feeds the blower 3 with the second driving voltage VS22 for rotation (in Step S7).

In Step S9, if the first or second driving voltage VS21 or VS22 from the first or second setting means 48 or 50 agrees with the driving voltage VS1 from the automatic control section 43 in Step S8, a flag is established to indicate that the start controlling operation is completed. In Step S10, the blower is started at a predetermined delay time after the evaporator starts cooling so as to eliminate the odor produced by the evaporator, and another flag is established to indicate that the "magic cool" operation for quick cooling is completed. In Step S11, the blower 3 is brought into the automatic control mode and driven at the driving voltage VS1 by the automatic control section 43.

If the first or second driving voltage VS21 or VS22 from the first or second setting means 48 or 50 does not agree with the driving voltage VS1 from the automatic control section 43, the blower 3 is rotated at the first or second driving voltage VS21 or VS22 in Step S12.

In the above Step S1, if the control device is in the cooler mode in response to a mode switching signal, the volume of an air flow is increased by the cooler start control similar to the conventional technology.

As described above, according to the invention, when the operational temperature at the starting time of the blower is at least the predetermined temperature, the speed of the blower is increased as a function of time so as to prevent any violent increase in the volume of an air flow from the blower in the heating mode, thus preventing the driver or passenger from feeling cold air.

While a preferred embodiment of the invention has been described in specific terms, such description is for illustrative purposes only, and it is to be understood that changes and variations may be made without departing from the spirit and scope of the invention defined in the following claims.

What is claimed is:

1. An improved control device for controlling the speed of a blower of a vehicle air conditioner in response to changes of an operational temperature (TP) which is a function of at least a compartment temperature (Tr), wherein the improvement comprises:
    first setting means for increasing the speed of said blower as a linear function of time when said operational temperature exceeds a first predetermined temperature (T1); and
    second setting means for increasing the speed of said blower along a characteristic line, the slope of which varies with a value (TP1) of said operational temperature where a temperature of engine cooling liquid reaches a second predetermined temperature.

2. An improved control device according to claim 1, which further comprises temperature setting means for setting a desired temperature Td, which is related to said operational temperature TP as follows:

$$TP = Td + (Tr - N)$$

where N is a constant.

3. A vehicle air conditioner including a blower, which comprises:
    desired temperature setting means for setting a desired temperature (Td) within a vehicle compartment;
    a compartment temperature sensor for sensing a compartment temperature (Tr) within said vehicle compartment;
    an operational temperature generator responsive to said desired temperature and said compartment temperature to generate an operational temperature (TP);

temperature limit setting means for setting a first predetermined temperature (T1);

a first comparator for comparing said operational temperature and said first predetermined temperature to generate a first signal ($\alpha$) when said operational temperature is equal to or higher than said first predetermined temperature and a second signal ($\beta$) when said operational temperature is lower than said first predetermined temperature;

first speed setting means responsive to said first signal to increase the speed of said blower along a first characteristic line in a predetermined period of time; and second speed setting means responsive to said second signal to increase the speed of said blower along a second characteristic line in a period of time which varies with an engine coolant temperature.

4. A vehicle air conditioner including a blower, which comprises:

desired temperature setting means for setting a desired temperature within a vehicle compartment;

a compartment temperature sensor for sensing a compartment temperature within said vehicle compartment;

an operational temperature generator responsive to said desired temperature and said compartment temperature to generate an operational temperature;

temperature limit setting means for setting a first poredetermined temperature;

a first comparator for comparing said operational temperature and said first predetermined temperature to generate a first signal when said operational temperature is equal to or higher than said first predetermined temperature and a second signal when said operational temperature is lower than said first predetermined temperature;

first speed setting means responsive to said first signal to increase the speed of said blower along a first characteristic line in a predetermined period of time;

second speed setting means responsive to said second signal to increase the speed of said blower along a second characteristic line in a period of time which varies with an engine coolant temperature;

automatic speed control means for controlling the speed of said blower along a third characteristic line which is a function of a total temperature (T); and a second comparator for comparing a first output (VS21) of said first speed setting means or a second output (VS22) of said second speed setting means with a third output (VS1) of said automatic speed control means to switch control of the speed of said blower to an automatic mode when said first or second output is equal to or greater than said third output.

* * * * *